United States Patent
Nygren et al.

(10) Patent No.: US 8,955,654 B2
(45) Date of Patent: Feb. 17, 2015

(54) SHOCK ABSORBER WITH INCREASING DAMPING FORCE

(75) Inventors: Nils Göran Nygren, Huddinge (SE); Magnus Danek, Huddinge (SE); Johan Jarl, Stockholm (SE)

(73) Assignee: Ohlins Racing AB, Upplands Vasby (SE)

( * ) Notice: Subject to any disclaimer, the term of this patent is extended or adjusted under 35 U.S.C. 154(b) by 528 days.

(21) Appl. No.: 12/747,478

(22) PCT Filed: Dec. 10, 2008

(86) PCT No.: PCT/SE2008/051431
§ 371 (c)(1),
(2), (4) Date: Oct. 11, 2010

(87) PCT Pub. No.: WO2009/078791
PCT Pub. Date: Jun. 25, 2009

(65) Prior Publication Data
US 2011/0017558 A1    Jan. 27, 2011

(30) Foreign Application Priority Data
Dec. 14, 2007 (SE) ........................... 0702798

(51) Int. Cl.
*F16F 9/34* (2006.01)
*F16F 9/516* (2006.01)
(Continued)

(52) U.S. Cl.
CPC ............... *F16F 9/516* (2013.01); *F16F 9/3485* (2013.01); *F16F 9/49* (2013.01)
USPC ................... 188/322.15; 188/282.5; 188/288; 92/84

(58) Field of Classification Search
CPC ........... F16F 9/3485; F16F 9/49; F16F 9/516; F16F 9/483; F16F 9/082; F16F 9/096; F16F 9/48
USPC .............. 188/280, 281, 284, 288, 282.5, 313, 188/316, 317; 92/84, 85 B, 143, 193, 201, 92/206; 251/63.4
See application file for complete search history.

(56) References Cited

U.S. PATENT DOCUMENTS 3,447,644 A * 6/1969 Duckett ....................... 188/288
4,624,347 A * 11/1986 Mourray ................. 188/322.15
(Continued)

FOREIGN PATENT DOCUMENTS

EP         1 006 292 A1    6/2000
GB           998742 A       7/1965
SE          515321 C2       7/2001

OTHER PUBLICATIONS

International Search Report; PCT/SE2008/051431; Mailed Date: Mar. 10, 2009; 3 pages.

*Primary Examiner* — Robert A Siconolfi
*Assistant Examiner* — Charles Poon
(74) *Attorney, Agent, or Firm* — Knobbe Martens Olson & Bear LLP

(57) ABSTRACT

A vehicle shock absorber generates an additional counter-force acting counter to the direction of movement near the limit position of movement. The shock absorber substantially comprises a damping medium-filled damping cylinder that is divided into two damping chambers by a main piston. The main piston is axially moveable relative to the damping cylinder and is attached to a piston rod. A second piston/damping piston that contains one or more first and second through-ducts is mounted to the piston rod. The ducts are defined by first and second flow-limiting devices such as multiple thin washers. The damping piston slides in a restricting space located in the damping cylinder. The restricting space has an inside diameter smaller than the inside diameter of the damping cylinder. The additional counter-force is substantially constant throughout the entire stroke in order to create gentle braking of the damping movement.

12 Claims, 5 Drawing Sheets

(51) Int. Cl.
*F16F 9/348* (2006.01)
*F16F 9/49* (2006.01)

(56) References Cited

U.S. PATENT DOCUMENTS

| | | | | |
|---|---|---|---|---|
| 4,653,339 | A | * | 3/1987 | Komatsu et al. ................ 74/422 |
| 5,413,195 | A | * | 5/1995 | Murakami ................ 188/282.6 |
| 5,769,192 | A | * | 6/1998 | Beck ........................ 188/322.15 |
| 5,810,128 | A | * | 9/1998 | Eriksson et al. ............. 188/289 |
| 6,446,771 | B1 | * | 9/2002 | Sintorn et al. ................ 188/288 |
| 7,441,640 | B2 | * | 10/2008 | Russell ................... 188/322.15 |
| 2002/0053493 | A1 | * | 5/2002 | Sintorn et al. ............. 188/282.9 |
| 2003/0051957 | A1 | * | 3/2003 | Lemieux ................. 188/322.15 |
| 2005/0092565 | A1 | * | 5/2005 | Asadi et al. .............. 188/322.15 |
| 2012/0061194 | A1 | * | 3/2012 | Yu ............................... 188/288 |

* cited by examiner

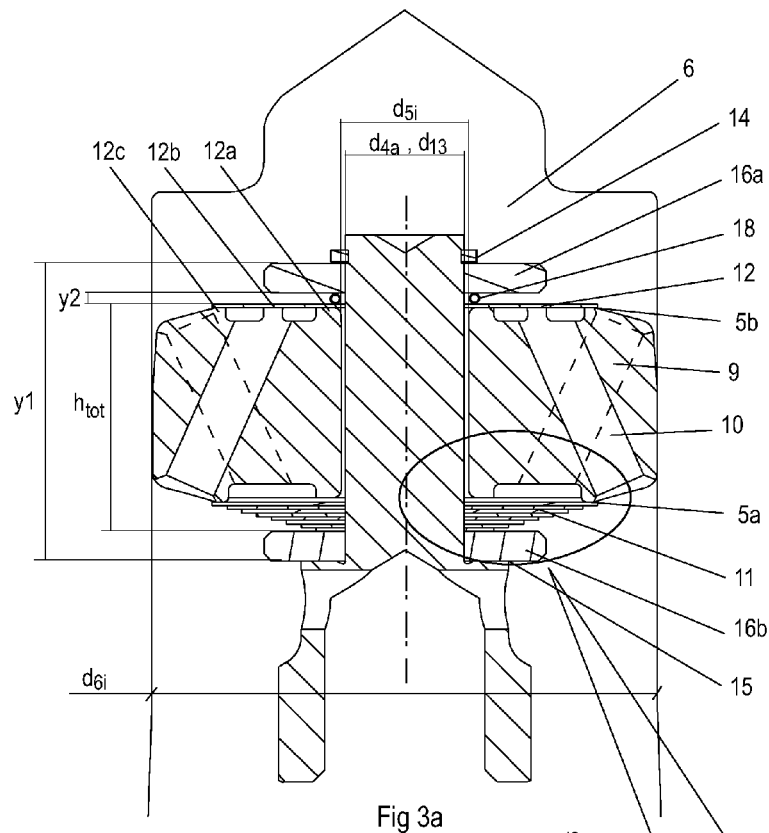
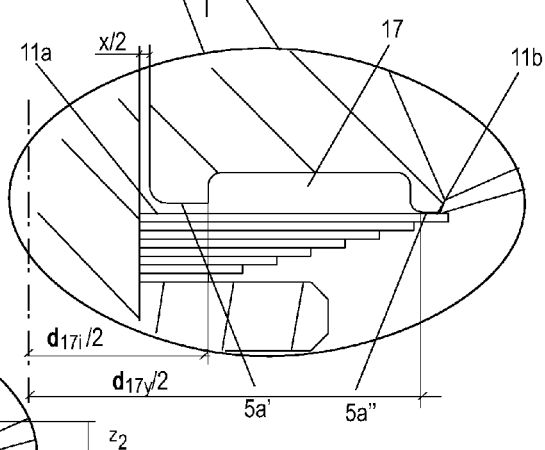
Fig 3b
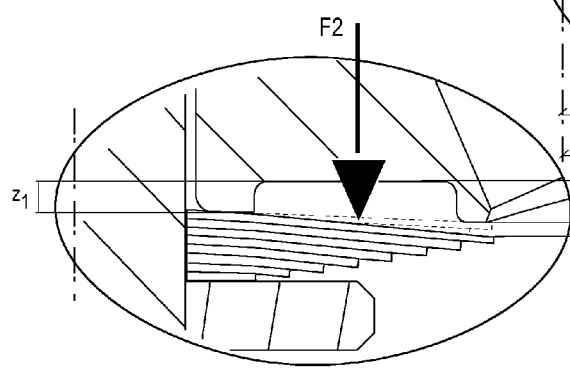
Fig 3c
Fig 3a

SHOCK ABSORBER WITH INCREASING DAMPING FORCE

CROSS-REFERENCE TO RELATED APPLICATIONS

This application is a U.S. National Phase of International Application No. PCT/SE2008/051431, filed Dec. 10, 2008, which claims priority to Swedish Patent Application No. 0702798-0, which was filed on Dec. 14, 2007

BACKGROUND OF THE INVENTION

1. Field of the Invention

The invention relates to a vehicle shock absorber comprising a damping medium-filled damping cylinder divided into two damping chambers, a compression chamber and a return chamber, by a main piston attached to a piston rod. The main piston moves axially in the damping cylinder in a compression and return movement. When the shock absorber reaches a certain compressed state, the movement is slowed by a function that increases the damping.

2. Description of the Related Art

This type of shock absorber is disclosed, for example, by EP0565832, GB998742 or the applicant's patent EP1006292B1, in which the compression movement is slowed by a second piston, herein referred to as the damping piston, which at a certain stroke length reaches a cup having a smaller diameter than the damping cylinder.

It has proved a problem, in a shock absorber with this type of progressive damping, to create a gentle slowing of the damping movement in the limit position. When the second piston reaches the cup of smaller diameter, the piston has a high velocity, which generates a large braking force around the point of maximum engagement. The counter-force then diminishes as the velocity decreases.

A shock absorber configured according to EP1006292, for example, has a second piston with a number of thin washers, a so-called shim stack, which opens under a certain force. The opening force is generated when the pressure in the cup acts on the opening area of the shim stack. The opening characteristic of a shim stack can be varied by adjusting the size, thickness, number and reciprocal arrangement of the washers (i.e., the shims). A relatively progressive damping characteristic is most often created, which creates a force that increases with velocity, which leads to large increases in the force per unit time when the second piston comes into engagement at a high velocity. This behavior can be a problem for a driver of the vehicle, because the slowing may be perceived as jerky. Rapid changes in the force between the wheel and the road surface risks leading to rapid changes in the distribution of the adhesion between the road surface and the different wheels. This makes handling of the vehicle more difficult, since it becomes less predictable. It is therefore desirable, instead of having a counter-force that increases with increasing velocity, to have a counteracting damping force that is as constant as possible throughout slowing of the movement.

EP0565832 also illustrates a third problem of the known technology, which is the problem of creating a function that will afford a fully controllable slowing of the damping movement without the second piston at the same time contributing to a geometrically over-defined system, which may become locked or require extremely precise tolerances. In EP0565832 this problem is resolved in that the second piston has an outside diameter that is significantly smaller than the inside diameter of the cup, and in that any movement in a radial direction is absorbed by a flexible washer. EP1006292 also resolves this problem in that the second piston has an outside diameter that is smaller than the inside diameter of the cup. In this case, however, the leakage flow of damping medium that passes on the outside of the piston is deducted from the total braking function, that is to say the braking characteristic is not solely determined by the opening characteristic of the shim stack. At low piston velocities the braking characteristic is in principle determined solely by the magnitude of the leakage flow.

In both cases this leads to a very progressive damping characteristic, which is to say the damping force increases sharply with the velocity, with all the implicit disadvantages described above.

SUMMARY OF THE INVENTION

The present invention is intended to solve the problem of creating a gentle retarding of movement near the limit position of a shock absorber movement, which will prevent bottoming in the shock absorbing device, the gentle braking creating the prerequisites for a comfortable vehicle that also is predictable for the driver.

The invention also addresses the problem of ensuring that the force serving to brake the damping movement increases with the velocity.

A further problem addressed by the invention is that of allowing a fully controllable braking of the damping movement without the second piston contributing to a geometrically over-defined system that is capable of locking.

The invention is furthermore intended to solve these problems in a simple way that does not require extremely precise tolerances.

The invention relates to an arrangement in a vehicle shock absorber intended to create an additional counter-force acting counter to the direction of movement in the limit position(s) of a movement/stroke between the parts of the shock absorber moving relative to one another, and to a shock absorber comprising such an arrangement.

The shock absorber in both cases basically comprises a hydraulic damping medium-filled damping cylinder divided into two damping chambers, for example a compression chamber and a return chamber. The two damping chambers are divided by a main piston that is axially moveable relative to the damping cylinder and that is attached to a damping piston holder part, which is fastened to or which forms a part of a piston rod. Also arranged around the piston rod is at least a second piston/damping piston, the first side of which faces towards the main piston and contains one or more first and second through-ducts. The ducts are defined in a direction of flow by flow limiters, which produce a restriction of the damping medium flow. The flow limiters preferably are embodied as one or more thin washers or shims. The first of these ducts, at least, are defined by a first flow limiter on the first side of the damping piston. The damping piston has a piston outside diameter smaller than the outer diameter of the main piston and is intended to slide in a restricting space located in and hydraulically coupled to the damping cylinder. The restricting space, which may take the form of a cup, for example, has an inside diameter smaller than the inside diameter of the damping cylinder.

A braking of the damping movement commences at a certain stroke length which corresponds to the distance of the damping piston reaching the restricting space. The counter-force from the shock absorber acting counter to the direction of movement derives partly from the pressure drop over the main piston and partly from the pressure drop over the damping piston when the damping piston is engaged in the restricting space. Once fully engaged within the restriction space, the force from the damping piston is substantially constant largely throughout the entire stroke as the damping piston moves towards its limit position. This is due to the design of the damping piston, which generates a damping force that varies little as a function of the velocity. This has been achieved in that the damping medium flow acting on the first flow limiter is designed to act in a space located between the first flow-limiting device and the side of the damping piston remote from the direction of movement. This space is of such a large outer radial extent that when pressure differentials over the damping piston open the flow path through the first ducts, the restriction of the damping medium flow varies minimally with increased flow, that is to say it produces low lifting heights of the first flow limiter even in the case of relatively large flows. This results in small variations in the pressure drop over the first flow limiters as the flow varies.

Consequently when the flow path through the first ducts opens, the first flow limiter rises a certain lifting height from the damping piston, so that an opening area is created between the first flow limiter and the side of the damping piston remote from the direction of movement. This opening area determines the restriction of the damping medium flow.

Moreover, the leakage flow past the piston has been minimized, which is to say the flow between the damping piston and the inner surface of the restricting space varies less as a function of the pressure. A minimal leakage flow is made possible in that the damping piston is designed to move in a radial direction in relation to the damping piston holder. A modulation of the restricting space is then possible without the need for a large difference between the outside diameter of the damping piston and the inner surface of the restricting space.

In order to allow a certain radial movement of the separating piston it is moreover not fully locked in an axial direction. This means that the tensioning, which varies as a function of the position of the damping piston relative to the device holding it, is influenced by any axial movement. Tensioning is made possible by the geometric design of the first flow limiter. The flow limiter is held between an outer damping piston surface and an inner damping piston surface, which are axially offset in relation to one another. The maximum counter-force for opening the first flow limiter is required when the flow limiter is under maximum tension. Maximum tensioning is obtained when the axial movement of the damping piston towards the main piston reaches its maximum. The flow limiter then bears against both the inner damping piston surface and the outer damping piston surface. The lower the velocity of the piston rod, the lower the impinging flow through the damping piston and hence also the lower the pressure drop over the damping piston, which is to say the axial movement of the damping piston towards the main piston is reduced.

The design with a large surface for the pressure to act upon in order to create the tensioning means that the tensioning can be achieved even in the event of small pressure drops over the damping piston, which is to say the tensioning is kept constant down to very low velocities. Since the velocity is usually greatest just when the damping piston has reached full engagement in the cup-shaped restricting space, the tensioning and the flow through the first flow limiter also reach a maximum at this point, which is to say the force acting on the first flow limiter is then greatest. Because the design of the flow limiter contributes to a damping piston that gives a slight increase in the pressure drop as the flow increases, the counter-force is reliably maintained even as the velocity and hence also the flow diminish. When the velocity then falls as the damping piston approaches its limit position, the counter-force also diminishes.

In a further embodiment of the arrangement an additional counter-force is generated in the limit position of both stroke directions because a damping piston is located in each damping chamber. Both damping pistons are then located with their first side facing towards the main piston.

This design means that the damping piston is moveable in an axial and in a radial direction in relation to the piston rod. A modulation of the restricting space is therefore possible without the damping piston catching or without the need for a large amount of play between the damping piston and the inside diameter of the restricting space.

The shock absorber is characterized in that the first of the damping piston through-ducts opens into a space between an inner radial extent and an outer radial extent located between the first side of the damping piston and the first flow-limiting device. The space has a compression area that is greater than the area of the through-duct/the first of the through-ducts or the total area. The space also has a certain depth, so that damping medium can move therein. The damping piston comprises at least two first through-ducts and the space links at least two first through-ducts together. The outer radial extent of the space creates a large opening area even when the flow limiter lifts to a small lifting height from the damping piston. This means that when the first flow limiter has opened, the damping force only varies slightly in response to a change in the flow.

The damping piston is also designed with a radial play around the damping piston holder part but with a minimal play between the damping piston and the inside diameter of the restricting space. The damping piston is therefore able to move radially in relation to the damping piston holder part. The damping piston can also move axially in relation to the damping piston holder part, a movement which is limited by two position-limiting parts arranged in or on the damping piston holder part.

In a first embodiment of the invention the damping piston moves in opposition to a resistance in an axial direction. This resistance may be created by a resilient device arranged between the damping piston and the position-limiting parts.

In a further embodiment the damping piston moves in opposition to a resistance created by a tensioning of the first flow limiter. This tensioning is created because the first flow limiter is designed in a closed position to bear against a first and a second damping piston surface, which are offset in relation to one another. There the first damping piston surface is arranged on the first side of the damping piston inside the inner radial extent of the space and the second damping piston is arranged outside the outer radial extent of the space. The damping piston also can be arranged so that it moves in opposition to a combined resistance from both the resilient device and the tensioning force.

In a third embodiment of the shock absorber two damping pistons are arranged on the piston rod, one on a first side of the main piston and the other on a second side of the main piston. Both of the damping pistons have their first side facing towards the main piston.

The invention will now be described in more detail below, with references to the drawings attached.

BRIEF DESCRIPTION OF THE DRAWINGS

FIG. 3a shows an enlarged view of a damping piston that is arranged and configured in accordance with certain features, aspects and advantages of the invention.

FIG. 3b shows a further enlarged view of the damping piston with a closed first flow limiter without tensioning.

FIG. 3c shows a further enlarged view of the damping piston with an open first flow limiter and with tensioning.

DETAILED DESCRIPTION OF THE PREFERRED EMBODIMENT

Figures 1A, 1B:
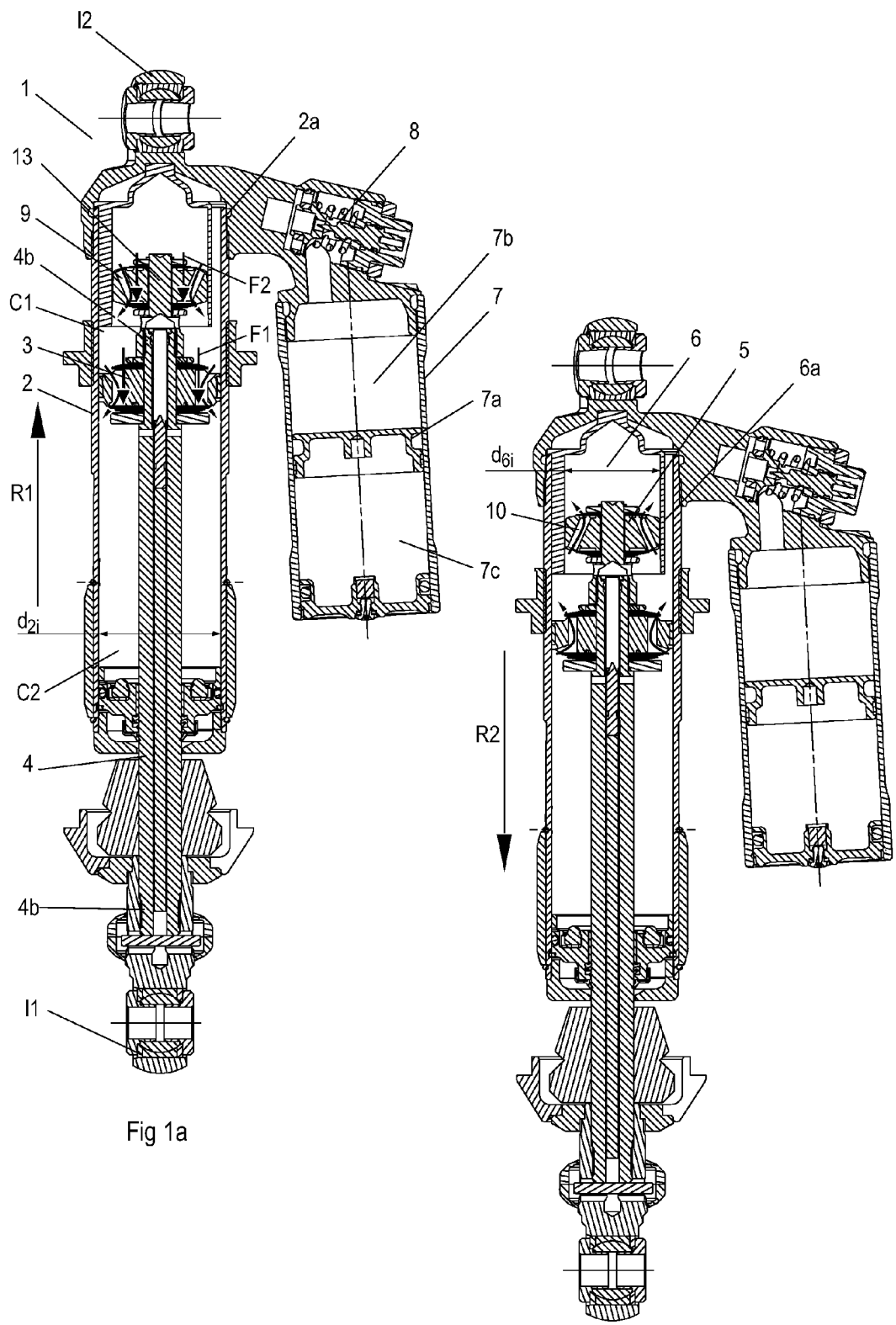
FIG. 1 shows a shock absorber arranged and configured in accordance with certain features, aspects and advantages of the invention.

FIG. 1 shows a shock absorber 1 according to the invention. The shock absorber 1 in this embodiment comprises a damping cylinder 2 filled with damping medium M1 and divided into two damping chambers by a main piston 3 attached to a piston rod 4. The damping medium M1 is preferably hydraulic oil, which may contain associated additives of a type known in the art. Alternatively glycol and/or water may be used as fluid or damping medium. The two damping chambers may be referred to as a compression chamber C1 and a return chamber C2, since the main piston 3 moves axially in the damping cylinder 2 in a compression movement and a return movement in proportion to the movement of a vehicle wheel and chassis towards or away from one another in the directions R1, R2.

The second piston or damping piston 5, which has an outside diameter $d_{5y}$, is seated on a damping piston holder part 13, located at an upper piston rod end 4a on the compression side of the main piston 3. The damping piston 5 is designed to move axially in a restricting space 6, defined by a substantially cup-shaped part 6a. The restricting space 6 has an inside diameter $d_{6i}$, which is smaller than the inside diameter $d_{2i}$ of the damping cylinder 2.

The lower piston rod end 4b has a first fixing member I1, for example an end eye, which is intended for attaching the damper 1 to a part of a vehicle in question that moves with the underlying road surface, preferably a wheel or runner. At the upper end 2a of the damping cylinder 2 the damper comprises a second fixing member I2, such as a cylinder head with associated top eye, which can be attached to a chassis or frame part of a vehicle in question. It also is possible to reverse the direction of assembly.

In the exemplary embodiment, the shock absorber 1 comprises a pressurized damper, wherein the damping medium in the damping cylinder, via the compression chamber, is pressurized by a pressurization reservoir 7, which is located externally of or internally inside the damping cylinder and inside which a pressurizing member 7a in the form of a piston, a rubber bladder or the like is arranged. The pressurization reservoir 7 in a first space 7b encloses damping medium, preferably the aforementioned hydraulic oil with any additives or other fluid (see above). The pressurization reservoir is defined by the pressurizing member 7a into a second space 7c, which contains a second medium more compressible than the damping medium. The more compressible second medium may consist of a gas, such as air, nitrogen gas or other gas with additives, for example. Filling the second space with a more compressible medium creates a basic pressure that pressurizes the damping medium. The compressible medium may also be replaced by a mechanical member, such as a spring or the like.

The pressurization of the damper and also the damping characteristic of the damper are adjusted by one or more valves 8 that are arranged between the pressurization reservoir 7 and the damping cylinder 2.

When the damper is working, the piston rod 4 moves at a certain velocity in relation to the damping cylinder 2 and the certain velocity results in a certain damping medium flow through the main piston 3. In addition, when the damping piston is in the limit position, the certain velocity also results in a certain damping medium flow through the damping piston 5. During a damping stroke, the main piston 3 usually has the highest velocity when it is situated axially approximately in the middle of the damping cylinder 2. When the main piston 3 begins to approach its limit position, the velocity diminishes before reaching zero in the reversal position and then increases again when the main piston 3 reverses its direction of movement. As long as the second piston/the damping piston 5 is free in the damping chambers, only the main piston 3 contributes to the damping characteristic of the damper. When the piston rod 4 and the damping piston 5 move in the direction R1 towards the limit position, see FIG. 1a, and reach a cup 6a that defines the illustrated restricting space 6, the volume of damping medium that is enclosed in the restricting space 6 opposes continuing movement of the damping piston 5. An additional force F2 counteracting the movement R1 then is generated, which additional force F2 is superimposed on the damping force F1 that is generated by the main piston 3, and the additional force F2 combined with the damping force F1 brakes the movement in the limit position and counteracts bottoming of the damper. The magnitude of the counter-force F2 is determined by the pressure differential over the damping piston 5 and the effective compression area on which the pressure acts. The damping medium flow is determined by the pressure differential over the piston and the design of the restriction through which the damping medium flows.

Figure 2A:
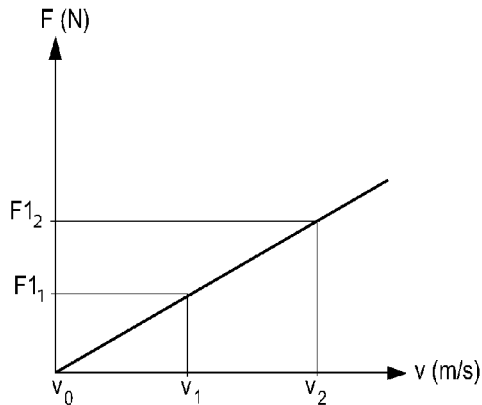
FIG. 2a shows a force-velocity diagram for a main piston that is arranged and configured in accordance with certain features, aspects and advantages of the invention and a force-velocity diagram for a main piston according to the state of the art.
Figure 2B:
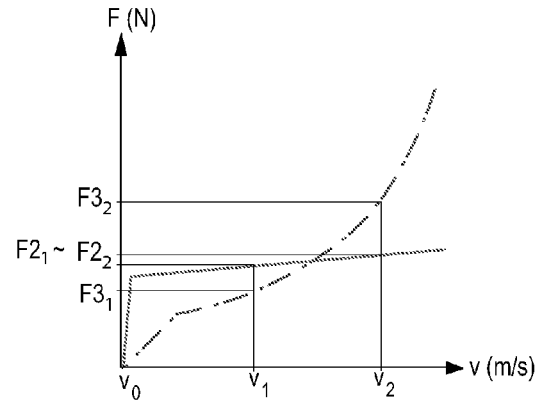
FIG. 2b shows a force-velocity diagram for a damping piston that is arranged and configured in accordance with certain features, aspects and advantages of the invention and a force-velocity diagram for a damping piston according to the state of the art.
Figure 2C:
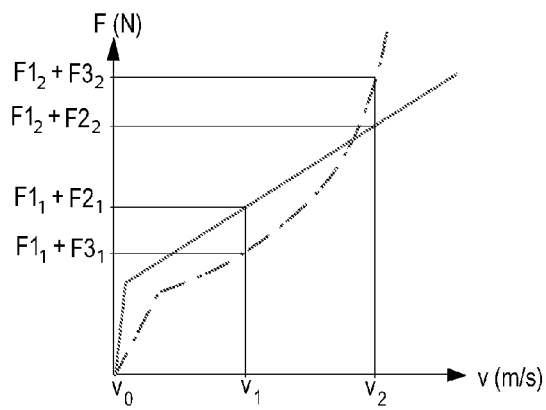
FIG. 2c shows a force-velocity diagram for the main piston with a superimposed damping piston, which is to say an entire shock absorber that is arranged and configured in accordance with certain features, aspects and advantages of the invention and an entire shock absorber according to the state of the art.
Figure 2D:
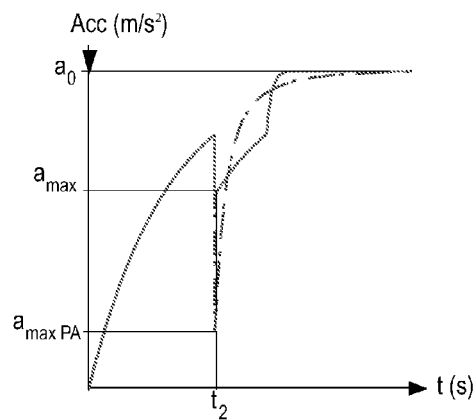
FIG. 2d shows a diagram of the acceleration absorbed over time in a shock that is arranged and configured in accordance with certain features, aspects and advantages of the invention and in a shock absorber according to the state of the art.

FIGS. 2a-2c show force-velocity diagrams for the main piston (FIG. 2a) and the damping piston (FIG. 2b) respectively and the main piston with the damping piston superimposed (FIG. 2c). FIG. 2d shows a diagram of the acceleration absorbed in the shock over time.

FIG. 2a shows an example of the increase in force generated by the pressure differentials over the main piston 3 of the shock absorber 1. The appearance of the curve may vary considerably but always increases with velocity. The velocity can be said to vary from $V_0$-$V_2$ when the additional damping piston 5 comes into engagement at velocity $v_2$.

In FIG. 2b the dash-dot chain line shows an example of the pressure build-up for a damping piston 5 according to the state of the art, wherein the force manifestly increases with the velocity v. The progressive increase in force derives from the relatively large leakage flow which in the state of the art passes between the damping piston and the damping cup that defines the restricting space. The solid line shows the pressure build-up for the damping piston 5 according to the invention, where the force remains substantially constant as the velocity increases. A slight shift in the force increase is shown even here, since a minimal leakage flow must be allowed to pass between the damping piston and the damping cup.

FIG. 2c shows the force absorbed by the main piston and the force absorbed by the damping piston superimposed, that is to say the force absorption for the complete shock absorber. The solid line represents the shock absorber according to the invention and the dash-dot chain line is the state of the art. Let it be assumed in this case that the compression of the damper occurs at the velocity $v_2$ when the damping piston engages in the damping cup. This means that the force increases from $F1_2$ to $F1_2+F2_2$ when a force limiter according to the invention is used. At the same time the counter-force persists further down the velocity range and the damping energy absorbed (which can be said to correspond to the area below the graph) can be increased without any increase in jerkiness. In a construction according to the state of the art, the damping force increases from $F1_2$ to $F1_2+F3_2$ when the damping piston goes into engagement. This damping force $F1_2+F3_2$ is greater than $F1_2+F2_2$ but at lower velocity $v_1$ the combined damping force $F1_1+F3_1$ is less than for the construction according to the invention $F1_1+F2_1$. The combined damping energy that the design construction according to the state of the art can absorb is therefore less than the design construction according to the invention, and the risk of the shock absorber bottoming, that is to say reaching maximum stroke length, is then greater.

FIG. 2d shows how the retardation occurs over time with a shock absorber having an additional force limiter according to the state of the art (dash-dot chain line) and a shock absorber having an additional force limiter according to the invention (solid line). A steep gradient of this curve corresponds to a heavy jerk, that is to say the driver experiences a large force from the damper. At time $t_2$ the additional damping piston 5 encounters the restricting space 6 and the velocity is braked heavily, which in the state of the art has the value $a_{maxPA}$ and according to the invention $a_{max}$. As can be seen, $a_{max}$ is much less of a drop than $a_{maxPA}$, which implies that the movement is braked less abruptly.

When the piston rod is working in the direction R2 from the limit position, see FIG. 1b, a low pressure drop generally is generated over the damping piston 5 and only a negligible additional force occurs that acts counter to the R2 direction of movement. The force is generated by a second flow limiter 12, which acts as a non-return valve and opens even in the event of small pressure differentials over the damping piston 5. The damping characteristics in this direction R2 are mainly determined by the pressure drop that is generated over the main piston 3.

FIG. 3a shows an enlarged view of the damping piston 5. The damping piston 5 has first and second through-ducts 9, 10, which are defined in a direction of flow by a first flow limiter 11 and a second flow limiter 12, which take the form of one or more thin washers. A third duct (not shown) may also be arranged through the piston. The third duct may have a fixed restriction, through which the magnitude of the flow does not vary substantially as a function of the pressure. The number of ducts is limited by the total volume of the damping piston, since a certain quantity of piston material must be retained in order to maintain the stability and strength of the damping piston, but the total number of ducts is preferably 6-12. Of the ducts, the first ducts 9 conduct the flow during a compression stroke towards the limit position and the second ducts 10 conduct the flow during a return stroke away from the limit position. The first flow limiter 11 is located on a first side 5a of the damping piston 5 and therefore is intended to restrict the flow of damping medium from the restricting space 6 to the ordinary damping chambers C1/C2. The second flow limiter 12 is located on a second side 5b of the damping piston 5 and limits the flow through the second ducts 10 when the damping piston 5 passes into the restricting space 6, that is to say in the direction R1. The second flow limiter 12 opens very slightly when the damping piston 5 moves away from the limit position, that is to say in the direction R2. A negligible counter-force is consequently created in the event of a stroke away from the limit position, but an open flow through the second ducts 10 is prevented in the case of a stroke towards the limit position. In order that the second flow limiter 12 will open slightly, it is embodied as a very thin washer, which flexes slightly and allows damping medium to pass through. It also has at least three support points 12a, 12b, 12c in order to reduce the flexure of the washer when the damping piston moves towards the limit position, that is to say in the direction R1.

The damping piston holder 13 part has a certain first diameter $d_{13}$. The damping piston holder part 13 can also be said to comprise the piston rod 4, if the piston rod 4 is designed so that, together with a threaded spacing sleeve, for example, for squeezing together the main piston flow limiter, it replaces the damping piston holder part 13. The upper part 4a of the piston rod 4 can then be said to have the first diameter $d_{13}$.

The diameter $d_{13}$ of the damping piston holder part 13 is smaller than the inside diameter $d_{5i}$ of the damping piston 5, so that a radial play x results between the damping piston 5 and the damping piston holder part 13. The damping piston 5 is able to move in a radial direction in relation to the damping piston holder part 13.

The location of the damping piston 5 on the damping piston holder 13 is determined by two position limiting parts 14, 15, which are arranged in the damping piston holder 13 part. In the embodiment according to FIG. 3a, the first position limiting part is a locking ring 14 arranged at the first piston rod end 4a and the second position limiting part is a stop in the form of a heel 15 created by a variation in the area of the damping piston holder part 13. The distance $y_1$ between the locking ring 14 and the heel 15 is somewhat greater than the total height $h_{tot}$ of the piston 5, including that of the flow limiters 11, 12, so that the piston can move axially by a distance $y_2$ in relation to the piston rod 4. This selected distance $y_2$ is preferably very short but is required so that the damping piston will be able to move freely in a radial direction. The axial degree of movement $y_2$ can also be adjusted by stop washers 16a, 16b, which have been placed between the locking ring 14 and the heel 15 and the flow limiters 11, 12, which bear against the first and second side 5a, 5b of the piston. The axial movement of the piston can be adjusted by resilient devices 18, preferably in the form of a corrugated washer or a resilient o-ring, arranged between the damping piston 5 and the position-limiting parts 14, 15.

Figure 4A:
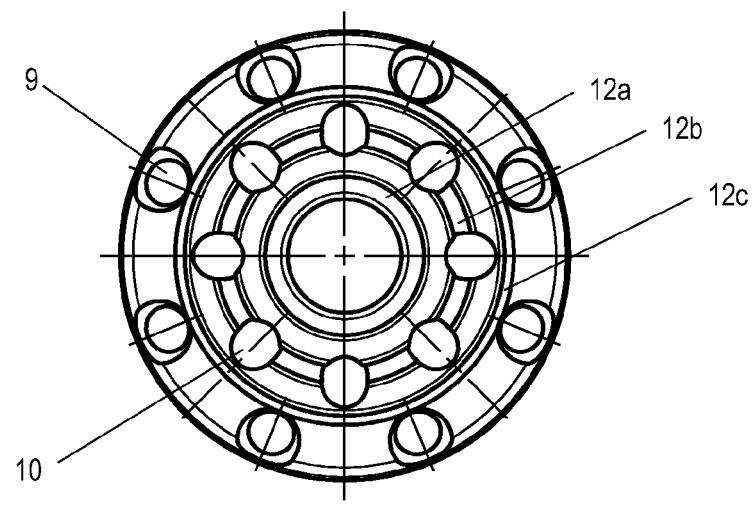
FIGS. 4a-4c show the damping piston with the dimensions thereof.
Figure 4B:
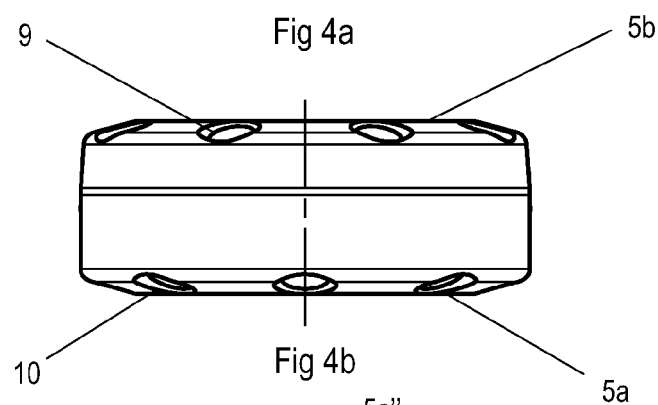
Figure 4C:
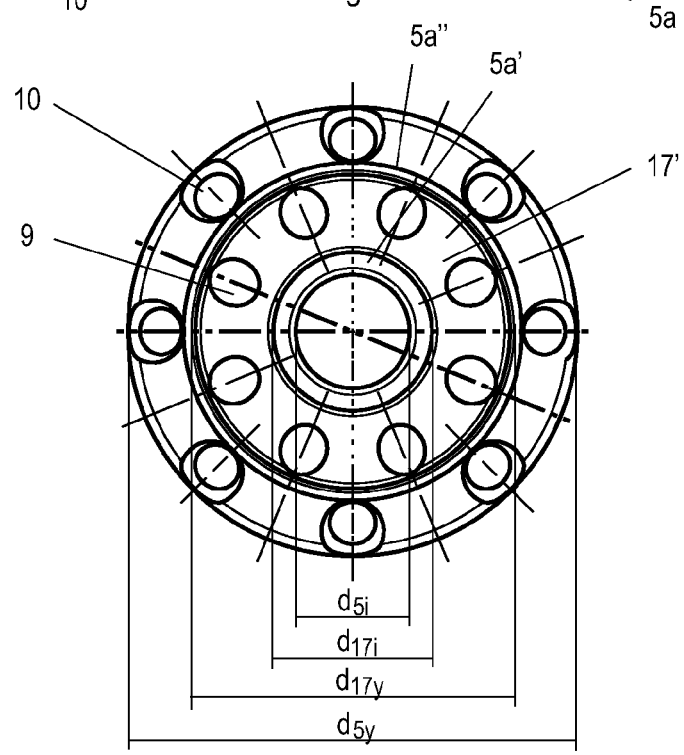

FIG. 3b and also FIGS. 4a-4c show an enlarged view of the damping piston wherein the first damping piston ducts 9 open into a space 17, which extends radially between an inside diameter $d_{17i}$ and an outside diameter $d_{17y}$ arranged between the first side 5a of the damping piston and the first flow-limiting device 11. The space 17 has a certain compression area 17' and a certain depth in relation to the first piston surface 5a. The inside diameter $d_{17i}$ of the space 17 is greater than the diameter $d_4$ of the piston rod/the piston rod extender.

The surface of the first side 5a of the damping piston, which results between the inside diameter $d_{17i}$ of the space and the piston rod, may be termed a first damping piston surface 5a'. The surface of the first side 5a of the damping piston that is outside the outside diameter $d_{17y}$ of the space may be termed the second damping piston surface 5a".

Depending on the design of the damping piston 5, the compression area 17' may also extend all the way out to the outside diameter of the second damping piston surface 5a". The outside diameter $d_{17y}$ of the space therefore is shifted outwards and the first flow limiter 11 in the closed position rests on a minimal external surface of the second damping piston surface 5a". When the flow limiter opens, the adhering characteristics of the damping medium against the damping piston surface 5a" are minimized.

The first damping piston surface 5a' is offset in relation to the second damping piston surface 5a" so that the depth $z_1$ of the space in relation to the first damping piston surface 5a' is shallower than the depth $z_2$ of the space in relation to the second damping piston surface 5a".

The space 17 encloses the piston rod 4 and the first ducts 9 open out into this space. Therefore, the damping medium that flows through these first ducts 9 can be dispersed into the space 17 where it contributes to an increase in the force, which at a certain value generates such a large force on the first flow limiter 11 that it begins to open. The additional counter-force F2 is substantially constant throughout the stroke as the damping piston 5 moves towards its limit position and is situated in the restricting space 6. This is because the restriction between the damping piston 5 and the first flow limiter 11 diminishes rapidly with the lifting height s.

The outside diameter $d_{17y}$ of the space 17 is so large that only a slight increase in the lifting height s of the first flow limiter 11 allows a greater quantity of damping medium to flow through the damping piston 5, see FIG. 3c. The damping medium flow therefore is determined by the opening area extending in an axial direction. The opening area is the enveloping area of the opening and therefore varies as a function of the outside diameter $d_{17y}$ of the space and the lifting height s.

FIG. 3c also shows how the first flow limiter 11 is transformed when it is exposed to a sufficient counter-force F2. The full opening force F2 occurs when the piston rod 4 moves at least at a certain minimum velocity in relation to the damping cylinder in the direction R1 towards the limit position and the damping piston 5 reaches the restricting space 6. Since no flow passes through the damping piston 5, the inner part 11a of the first flow limiter bears against the first damping piston surface 5a' and the outer part 11b of the first flow limiter bears against the second damping piston surface 5a". When the first flow limiter opens, its outer part 11b is therefore relieved from the second piston damping surface 5a' by a certain distance s, but the inner part 11a of the flow limiter continues to bear against the first damping piston surface 5a'.

FIGS. 4a-4c show only the damping piston 5 with its duct orifices and flow spaces. The damping piston 5 has a chamfer at its outside diameter $d_{5y}$ in the direction towards its second surface 5b, thereby facilitating the centering of the damping piston 5 in the restricting space 6. FIG. 4a shows a view of the second surface 5b of the damping piston, with the support points 12a, 12b and 12c of the second flow limiter 12. FIG. 4c shows a view of the first surface 5a of the damping piston showing the outside diameter $d_{17y}$ and inside diameter $d_{17i}$ of the space 17. The first damping piston area 5a' extends between the inside diameter $d_{5i}$ of the damping piston and the inside diameter $d_{17i}$ of the space, and the second damping piston area 5a" extends between the outside diameter $d_{17y}$ of the space and the outside diameter $d_{5y}$ of the damping piston.

Figure 5:
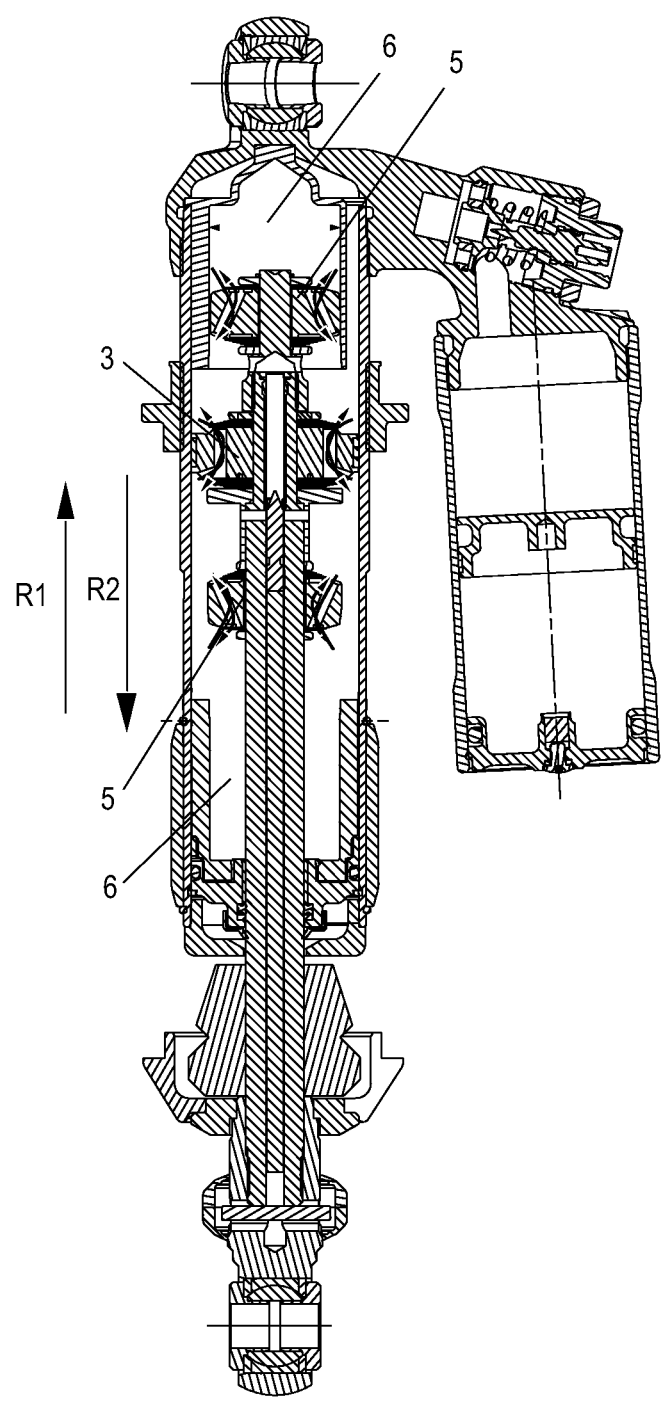
FIG. 5 illustrates another shock absorber that is arranged and configured in accordance with certain features, aspects and advantages of the present invention.

In a further variant of the shock absorber two damping pistons 5 are used, see FIG. 5, one on either side of the main piston 3 in order to generate an additional counter-force in the limit position of both stroke directions R1, R2. The damping pistons 5 are designed in the same way as described above.

The invention is not limited to the embodiment shown, a shock absorber in which both sides of the main piston are pressurized also being feasible, for example by pressurizing one space common to both of the damping chambers adjoining the main piston or directly adjoining the pressurization reservoir. The flow limiters can furthermore be any form of cone valve and therefore need not be shimmed valves. The invention can also be modified without departing from the scope of the following patent claims or the idea of the invention.

The invention claimed is:

1. An arrangement in a vehicle shock absorber for generating an additional force acting counter to movement in the limit position of a stroke between a piston rod and a damping cylinder of the shock absorber, the shock absorber comprising:
   the damping cylinder divided into a first damping chamber and a second damping chamber by a main piston, the main piston being axially moveable relative to the damping cylinder, the main piston being attached to the piston rod;
   a damping piston centered around a damping piston holder part and being positioned at a first end of the piston rod, the damping piston comprising a first side that faces towards the main piston and a second side that faces opposite the main piston, the damping piston comprising one or more first through-ducts and one or more second through-ducts;
   at least the first through-ducts being defined in a direction of flow on the first side of the damping piston by a first flow limiter, the first flow limiter producing a restriction of the damping medium flow from a restricting space located in the damping cylinder through the first through-ducts;
   the damping piston comprising an outside piston diameter, the outside piston diameter being smaller than an outside diameter of the main piston, the outside piston diameter being adapted to slide in the restricting space located in the damping cylinder and hydraulically coupled to the damping cylinder, the restricting space having an inside diameter smaller than the inside diameter of the damping cylinder;
   the additional force acting counter to movement is substantially constant throughout the entire stroke as the damping piston moves towards its limit position where the damping piston is situated in the restricting space, a minimal damping medium flow passing between the damping piston and the inside diameter of the restricting space while the damping medium flow that acts on the first flow limiter acts in a space arranged between the first flow limiter and the first side of the damping piston;
   the space arranged between the first flow limiter and the first side of the damping piston being of such a large outer radial extent that when pressure differentials over the damping piston open a flow path through the first through-ducts the pressure differentials over the damping piston vary minimally with increased flow;
   wherein the damping piston is radially and axially moveable relative to the damping piston holder part, the first flow limiter is arranged to resiliently load the damping piston relative to the damping piston holder part to resist axial movement of the damping piston relative to the damping piston holder part, the first flow limiter in a closed position resting on a radially outer damping piston surface and being spaced apart from a radially inner damping piston surface such that a gap exists between the first flow limiter and the radially inner damping piston surface and the first flow limiter in a tensioned position is tensioned between the radially outer damping piston surface and the radially inner damping piston surface that are axially offset in relation to one another such that the tensioning of the first flow limiter results from the first flow limiter bearing against the radially inner damping piston surface and being deflected towards and bearing against the radially outer damping piston surface.

2. The arrangement of claim 1, wherein when the flow path through the first through-ducts opens, the first flow limiter rises a certain lifting height from the damping piston so that an opening area is created between the first flow limiter and the first side of the damping piston.

3. The arrangement of claim 2, wherein the damping piston is adapted to move in an axial direction and a radial direction in relation to the piston rod so that a modulation of the restricting space is possible without a large difference occurring between the outside diameter of the damping piston and the inside diameter of the restricting space.

4. The arrangement of claim 3, wherein the first flow limiter opens when the piston rod moves with at least a certain minimum velocity relative to the damping cylinder and the damping piston reaches the restricting space such that the first flow limiter is bearing against the radially inner damping piston surface and is relieved from the radially outer damping piston surface.

5. The arrangement of claim 1 further comprising a second damping piston arranged along the piston rod such that the main piston is positioned between the damping piston and the second damping piston, the damping piston generating the additional force in a first direction and the second damping piston generating the additional force in a second direction that is opposite to the first direction.

6. A vehicle shock absorber comprising a damping cylinder divided into a compression chamber and a rebound chamber by a main piston, the main piston being axially moveable relative to the damping cylinder and attached to a piston rod, a damping piston being attached at a first end of the piston rod and being centered around a damping piston holder part of the piston rod, a first side of the damping piston facing towards the main piston, the first side containing one or more first through-ducts and one or more second through-ducts, at least the one or more first through-ducts being defined in a direction of flow on the first side of the damping piston by a first flow limiter such that the first flow limiter restricts flow from a restricting space located in the damping cylinder through the first through-ducts, the damping piston comprising an outside damper piston diameter, the outside damper piston diameter being smaller than an outside piston diameter of the main piston, the damping piston being adapted to slide in the restricting space located in and hydraulically coupled to the damping cylinder, the restricting space comprising an inside diameter smaller than an inside diameter of the damping cylinder, the one or more first through-ducts opening into a space defined among the first side of the damping piston, the first flow limiter, an inner radial extent of the damping piston and an outer radial extent of the damping piston, the space comprising a compression area that is greater than the area of the one or more first through-ducts, wherein the damping piston is radially and axially moveable relative to the damping piston holder part, and the first flow limiter is arranged to resiliently load the damping piston relative to the damping piston holder part to resist axial movement of the damping piston relative to the damping piston holder part, wherein the resilient loading results from the first flow limiter being tensioned towards a first damping piston surface on the first side of the damping piston relative to the damping piston holder, the damping piston further comprises a second damping piston surface on the first side of the damping piston, the first and second damping piston surfaces being axially offset in relation to one another, and wherein the first flow limiter in a closed position rests on the second damping piston surface and is spaced apart from the first damping piston surface such that a gap exists between the first flow limiter and the first damping piston surface and the first flow limiter in a tensioned position bears against the first damping piston surface and is deflected towards and bears against the second damping piston surface, and the first damping piston surface is arranged inside the radial extent of the space and the second damping piston surface is arranged outside the outer radial extent of the space.

7. The shock absorber of claim 6, wherein pressure acting on the compression area lifts the first flow limiter a distance that varies as a function of the outer radial extent.

8. The shock absorber of claim 7, wherein the damping piston has minimal radial clearance with the inside diameter of the restricting space.

9. The shock absorber of claim 8, wherein the axial movement is limited by two position-limiting parts arranged on either side of the damping piston in or on the damping piston holder part.

10. The shock absorber of claim 9, wherein the axial movement of the damping piston occurs in opposition to a movement resistance.

11. The shock absorber of claim 10, wherein the movement resistance to the axial movement of the damping piston is created by a resilient device arranged between the damping piston and at least one of the two position limiting parts.

12. The shock absorber of claim 6 further comprising a second damping piston arranged on the piston rod such that the main piston is interposed between the damping piston and the second damping piston with the second damping piston also comprising a first side having a space that defines a compression area, the first side of the damping piston and the first side of the second damping piston both facing towards the main piston.

* * * * *